H. UTARD & J. SMITH.
DRY BATTERY AND METHOD OF MANUFACTURING THE SAME.
APPLICATION FILED FEB. 3, 1913.
1,102,458.
Patented July 7, 1914.
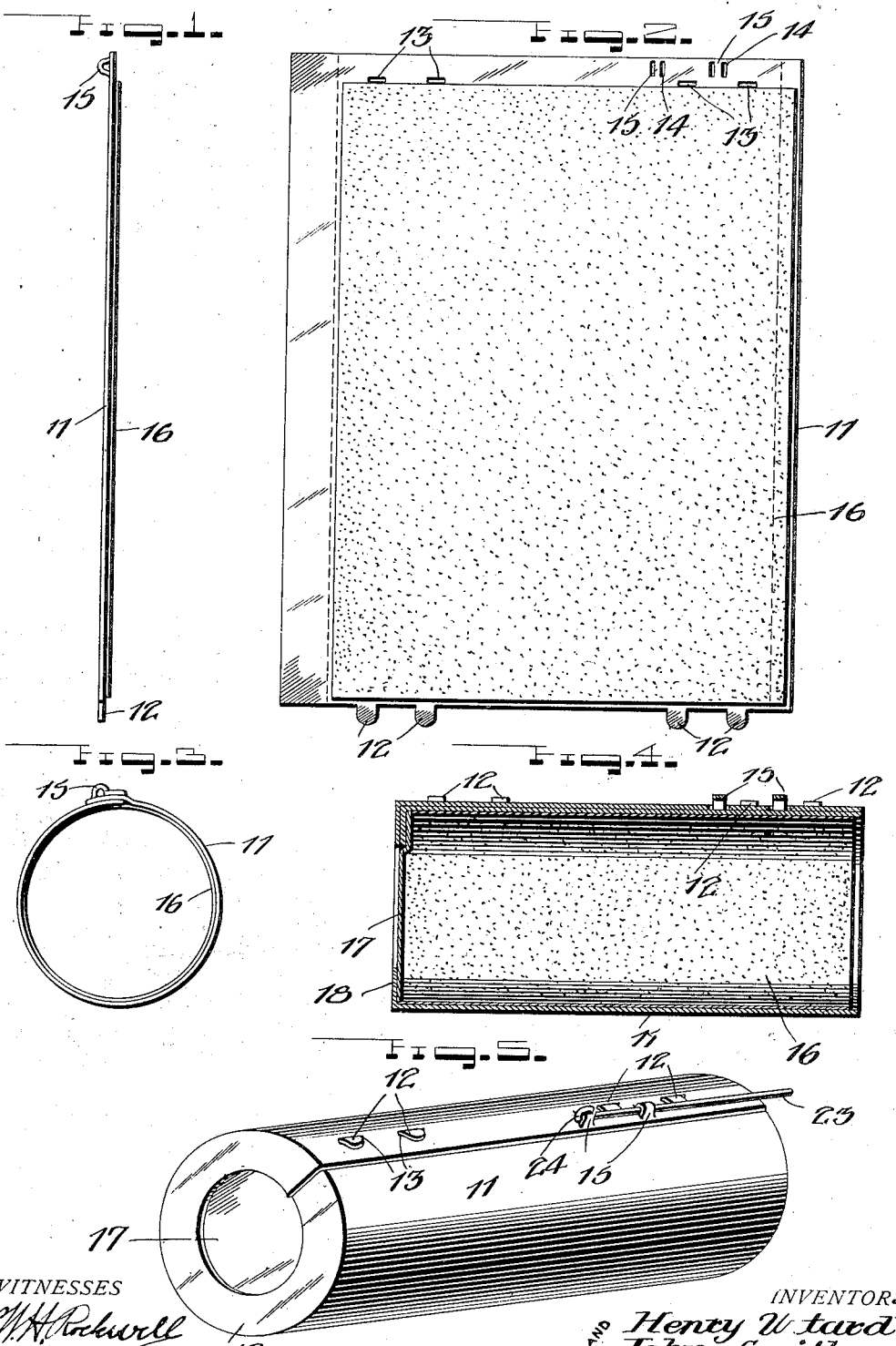

H. UTARD & J. SMITH.
DRY BATTERY AND METHOD OF MANUFACTURING THE SAME.
APPLICATION FILED FEB. 3, 1913.
1,102,458.
Patented July 7, 1914.
2 SHEETS—SHEET 2.
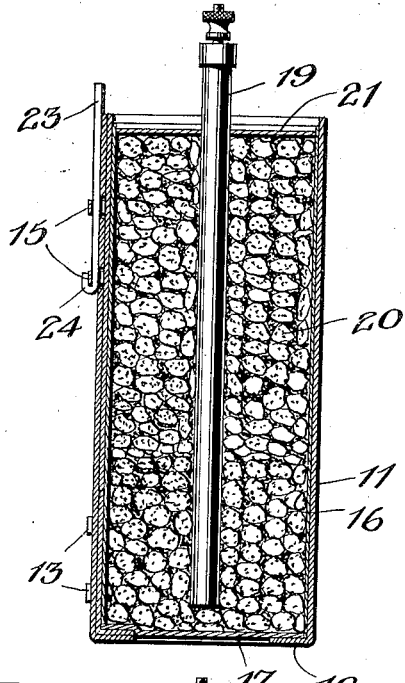
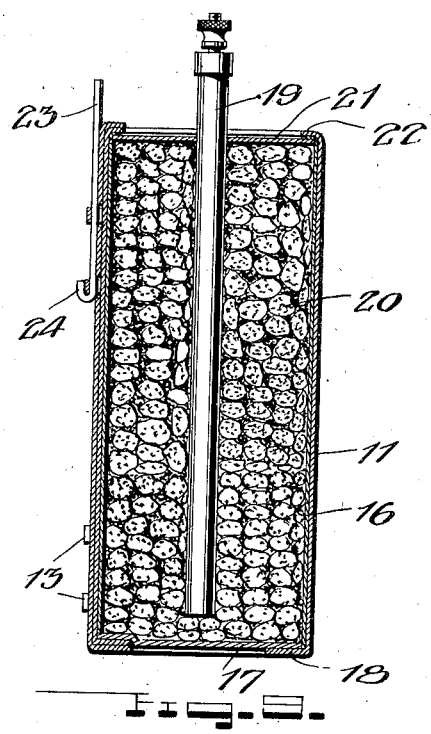
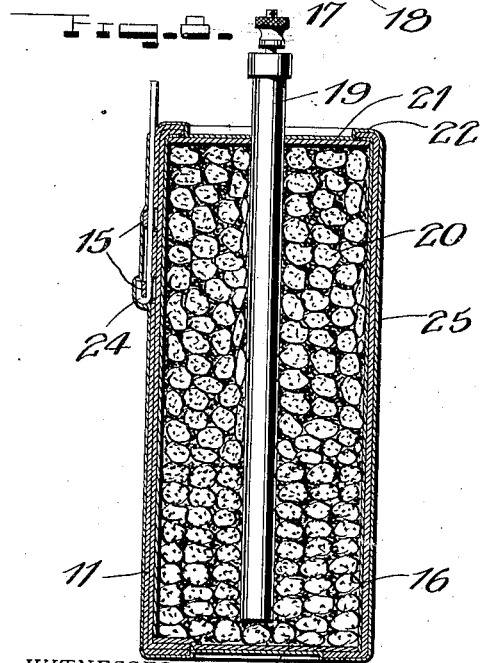
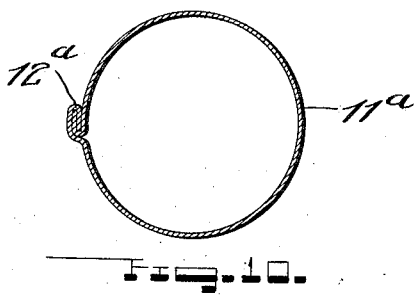
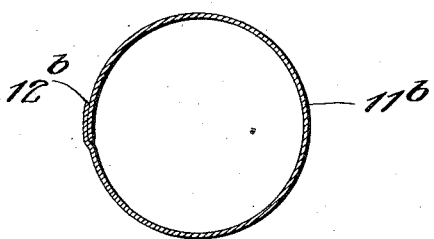
WITNESSES
INVENTORS
Henry Utard
John Smith
Attorney

UNITED STATES PATENT OFFICE.

HENRY UTARD, OF NEW YORK, AND JOHN SMITH, OF BROOKLYN, NEW YORK.

DRY BATTERY AND METHOD OF MANUFACTURING THE SAME.

1,102,458.  Specification of Letters Patent.  Patented July 7, 1914.

Application filed February 3, 1913. Serial No. 746,081.

*To all whom it may concern:*

Be it known that we, HENRY UTARD, a citizen of the United States, residing at New York, N. Y., and JOHN SMITH, a citizen of the United States, residing at Brooklyn, in the county of Kings and State of New York, have invented new and useful Improvements in a Dry Battery and Method of Manufacturing the Same, of which the following is a specification.

The invention relates to dry batteries and the method of manufacturing the same, and the primary object is to provide a novel, simple and effective method, whereby these articles can be produced cheaply and expeditiously, and the article so produced will be effective in action.

In the accompanying drawings, Figure 1 is an edge view of the shell blank. Fig. 2 is a face view thereof. Fig. 3 is an end view of the blank when formed into a tube. Fig. 4 is a longitudinal sectional view, showing one of the end closures in place. Fig. 5 is a perspective view of the blank, as illustrated in Fig. 4, with the terminal in place. Fig. 6 is a longitudinal sectional view, showing the battery elements in position and the top closure washer in place. Fig. 7 is a view similar to Fig. 6, but with the top closure secured. Fig. 8 is a longitudinal sectional view, showing the battery complete. Figs. 9 and 10 are cross sectional views, showing a modified form of shell blank.

Similar reference numerals designate corresponding parts in all the figures of the drawings.

In carrying out the invention, a sheet blank 11 of metal preferably zinc forming one of the battery elements is employed, which is preferably flat in its original condition, and in the form illustrated in the first eight figures, this blank is provided on one edge with projecting tongues 12, while its opposite margin has slots or openings 13 to receive the same. The said margin outside the slots, is furthermore provided with right angularly disposed slots 14 forming bridges 15 between them. A sheet of paper or other material 16, saturated with electrolyte and of slightly less area than the metal blank 11, is laid upon said blank, as shown in Figs. 1 and 2, and the blank with the electrolyte, is then formed into a tube, as illustrated in Fig. 3, the tongues 12 being passed through the slots 13 and doubled over, as shown.

The bridges 15 between the slots 14, are also preferably upset to provide alined eyes.

A closure disk 17 is then inserted in one end of the tubular blank, and the adjacent end margin is turned inwardly over said closure disk, as illustrated at 18. This produces a very effective bottom for the blank, thus forming a cup, as will be evident by reference to Fig. 4. The other battery member, as a carbon rod 19, is then introduced into said cup, and the space between the electrolyte sheet and this electrode 19 is packed with any well known battery compound 20. Another closure disk 21 is in like manner introduced into the top of the cup, though a plastic material, such as pitch or the like may be employed, if desired. The upper margin of the shell is then turned in over this closure disk, as illustrated at 22 in Fig. 8. A terminal stem 23 is passed through the alined eyes, and this is preferably done when the blank is first formed, for in producing said blank, the joint is rolled down, and this flattens down the eyes to some extent, making a very effective seam. The inner end of the terminal element 23, is preferably bent up, as shown at 24, so as to positively prevent its withdrawal. Finally, in the preferred form of construction, the battery thus produced is incased in an outer covering 25, which may be of any desired character as paper, but preferably is fabric that is woven upon the body and is impregnated with a water-proof compound.

As indicative of the manner in which the structure may be modified, attention is called to Figs. 9 and 10, wherein the tubular blank is designated 11ᵃ, and has a lock seam joint 12ᵃ. In Fig. 10, the tubular shell is designated 11ᵇ, and the joint or seam 12ᵇ is formed by soldering the overlapped margins.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any advantages of the invention.

Having thus fully described our invention, what we claim as new, and desire to secure by Letters Patent, is:—

1. The method of manufacturing dry cells, which consists in applying to a substantially flat battery element blank sheet, a substantially flat sheet containing electrolyte and of less area than the battery element sheet, simultaneously forming the two into an open-ended tube with the electrolyte sheet forming the lining thereof, securing together the opposite margins of the battery element sheet outside the electrolyte sheet closing one end of said tube, to form a cup, and introducing an electrode and a battery compound through the other end.

2. The method of manufacturing dry cells, which consists in applying to a substantially flat battery element blank sheet a substantially flat sheet containing electrolyte of less area than the same, leaving a margin of the battery blank sheet uncovered, simultaneously forming the two sheets into an open-ended tube with the electrolyte sheet forming the lining thereof, placing a closure disk in one end of the tube, bending the uncovered margin of the element sheet over said closure to form a cup, and introducing an electrode and a battery compound through the other end.

3. In a battery structure, a tubular battery element having overlapping interlocking margins in contact with each other, and an electrolyte sheet arranged within the battery element against the inner face thereof and having substantially abutting edges at the overlapping interlocked margins of the element.

4. In a battery structure, a tubular battery element having overlapping interlocked margins, one margin having openings therethrough spaced from the adjacent edge and the other margin having tongues projecting from its edge and passing through the openings.

5. In a battery structure, a metallic battery element having slots and a terminal inserted in the slots and held thereby to the element.

6. In a battery structure, a metallic battery element having spaced sets of slots, the material between the slots being upset to form bridges, and a terminal inserted beneath the bridges and having one end offset to retain said terminal in place.

7. The method of manufacturing dry cells, which consists in applying to a substantially flat battery element blank sheet a substantially flat sheet containing electrolyte and of less area than the battery element sheet, simultaneously forming the two into an open ended tube with the electrolyte sheet forming the lining thereof, securing together the opposite margins of the battery element sheet outside the electrolyte sheet, closing one end of said tube, introducing an electrode and a battery compound through the other end, closing said other end, and weaving over the exterior, a casing.

8. The method of manufacturing dry cells, which consists in forming a tubular battery element with a sheet containing electrolyte on the inner side thereof, introducing an electrode and a battery compound into said tubular element, closing the same, and weaving upon the exterior thereof a covering or casing.

In testimony whereof we have hereunto set our hands in presence of two subscribing witnesses.

HENRY UTARD.
JOHN SMITH.

Witnesses:
CHAS. A. HAVILAND,
HARRY HOWE.